Patented Aug. 1, 1933

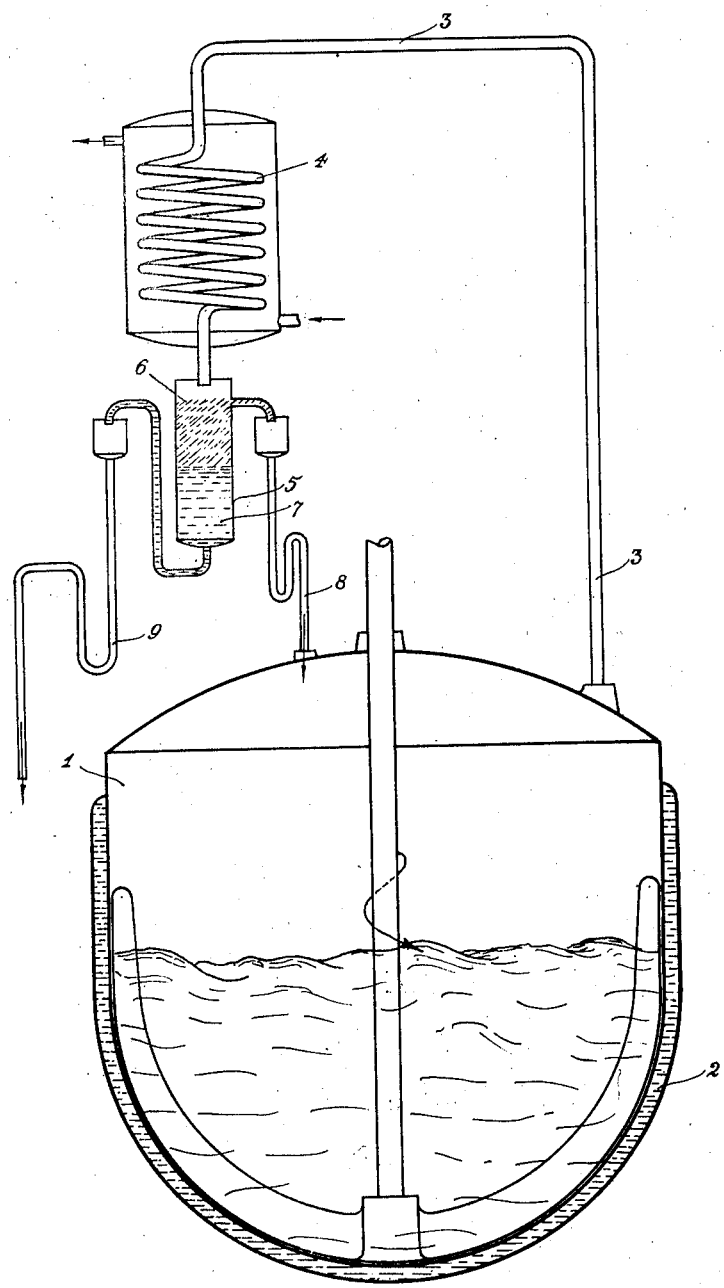

1,920,702

UNITED STATES PATENT OFFICE

1,920,702

MANUFACTURE OF CELLULOSE ETHERS, IN PARTICULAR BENZYLCELLULOSE

Anatolio Lautenberg, Milan, Italy, assignor to "Châtillon", Societá Anonima Italiana per la Seta Artificiale, Milan, Italy, a Corporation of Italy Application October 6, 1930, Serial No. 486,817, and in Italy December 21, 1929

5 Claims. (Cl. 260—152)

The present invention is concerned with the manufacture of cellulose ethers in particular benzyl-ether of cellulose.

These ethers are generally prepared by the action of halogen-substituted hydrocarbons or alkyl aryl or aralkyl sulfate on alkali cellulose.

To ensure a good yield it is necessary to use an alkalicellulose rich in alkali. It is well known that cellulose easily undergoes oxidation in the presence of concentrated alkali and that this oxycellulose thereby obtained gives ethers of poor plastic qualities.

As the esterification of the hydroxyl groups of the cellulose proceeds the cellulose becomes more resistant to concentrated alkali and it is possible to complete the reaction in the presence of highly concentrated caustic soda solution without reducing the quality of the final product.

In practice, as the reaction proceeds the concentration of NaOH diminishes by the formation of NaCl and water.

In order to complete the reaction it is necessary either to add solid caustic soda or to remove the water.

It is evident that the diminution of water is better from the economical point of view.

Up to date this elimination of water has been done directly by distillation either at ordinary or under reduced pressure.

Distillation at ordinary pressure is very slow when working at a temperature below 100° C. The distillation under vacuum is very rapid but difficult to regulate and moreover has the disadvantage of taking away appreciable quantities of etherifying agents in the case of benzyl-cellulose, appreciable quantities of benzyl-chloride.

This benzyl-chloride must be returned to the system. In view of the fact that the apparatus works under vacuum it is difficult to devise a continuous return for the benzyl-chloride.

I have found that it is possible to remove the water in a continuous manner and in any quantity desired by making use of the property of forming azeotropic mixtures with water, possessed by various organic compounds, particularly hydrocarbons.

The compounds must be chemically inert towards the reaction mass and not miscible with water in the liquid state. For this reason it is possible to use benzene, benzol, petroleum ether etc.

By returning the condensed hydrocarbon to the system and by suitable choice of the hydrocarbon it is possible to eliminate any required quantity of water using only a small quantity of the hydrocarbon.

This method also results in an appreciable increase in the velocity of the reaction. The compound added can be a solvent or a nonsolvent of the cellulose ether. The attached sketch represents diagrammatically the process.

The alkalicellulose, alkali, and the etherifying agent are charged into the reaction vessel 1. This is heated to the desired temperature by means of the double jacket 2. A small amount of the compound e. g. benzene, benzol etc. is added.

At a certain temperature a mixture of vapours of the compound and water passes up the tube 3. This vapour is condensed in the condenser 4 and is collected in the receiver 5 where it separates into two layers 6 and 7.

The upper layer 6 is formed by the compound and returns to the reaction vessel by the siphon 8. The lower layer 7 consists of water which is withdrawn by the siphon 9.

This disposition eliminates the water in an automatic manner and with perfect regularity and permits any desired concentration of caustic soda in the reaction mass. *Example.*—100 kg. of shredded alkali cellulose (containing 30% cellulose, 15% of NaOH, 55% of water) are charged into the vessel. 33 kg. of powdered NaOH and 120 kg. of benzyl-chloride are added. The temperature is raised to 95° C. and 20 kg. of benzol are introduced.

After 30 minutes benzene vapours, containing 6% water vapours begin to pass through the condenser.

Continuously returning the condensed benzene and measuring the quantity of water collected, we have After 4 hours 20 l. of water total.
After 8 hours 35 l. of water total.
After 12 hours 45 l. of water total.

At this time the product shows the desired solubility, the alkali and the sodium chloride are washed out with water, then the water and the benzene are distilled off and the benzyl-cellulose isolated.

The invention is not limited to the present example. The etherification can be conducted in two or more stages and the elimination of water by the means described above can take place at any desired stage.

Regarding the expression "azeotropic mixture" as used in the claims, this means that the mixture is always formed by vapors of immiscible liquids.

Having now particularly described and ascertained the nature of my said invention and in what manner the same is to be performed, I declare that what I claim is:

1. A process for the manufacture of cellulose ethers, especially benzyl cellulose, consisting in regulating the concentration of caustic soda in the reacting mass at an approximate temperature of 95° C. by the elimination of water in the form of an azeotropic mixture with an added inert substance.

2. A process for the manufacture of cellulose ethers as in claim 1 in which compounds are chosen to form an azeotropic mixture, which compounds do not react with the reaction compounds.

3. A process for the manufacture of cellulose ethers as in claim 1 in which compounds are used to form an azeotropic mixture which are not miscible with water in the liquid state and they separate from water in the condensate by gravity.

4. A process for the manufacture of cellulose ethers as in claim 1 in which the substance employed to form the azeotropic mixture with water is caused to continuously return to the system.

5. A process for the manufacture of cellulose ethers as in claim 1, in which the elimination of water is continuous and can take place in any stage of the reaction.

ANATOLIO LAUTENBERG.